United States Patent [19]
Lavietes et al.

[11] Patent Number: 6,131,394
[45] Date of Patent: Oct. 17, 2000

[54] SYSTEM AND METHOD OF ACTIVE VIBRATION CONTROL FOR AN ELECTRO-MECHANICALLY COOLED DEVICE

[75] Inventors: Anthony D. Lavietes, Hayward; Joseph Mauger, Livermore; Eric H. Anderson, Mountain View, all of Calif.

[73] Assignee: The Regents of the University of California, Oakland, Calif.

[21] Appl. No.: 09/120,377

[22] Filed: Jul. 21, 1998

[51] Int. Cl.[7] ....................................................... F25B 9/00
[52] U.S. Cl. .................................................. 62/6; 62/55.5
[58] Field of Search ......................................... 62/6, 55.5

[56] References Cited

U.S. PATENT DOCUMENTS

| | | | |
|---|---|---|---|
| 5,392,607 | 2/1995 | Wu | 62/6 |
| 5,412,951 | 5/1995 | Wu | 62/6 |
| 5,531,074 | 7/1996 | Katagiri et al. | 62/6 |
| 5,552,609 | 9/1996 | Katagiri | 250/370.15 |
| 5,582,013 | 12/1996 | Neufeld | 62/6 |
| 5,809,792 | 9/1998 | Song | 62/55.5 |
| 5,836,165 | 11/1998 | Champion et al. | 62/55.5 |

OTHER PUBLICATIONS

CSA Engineering, Inc., "Active Vibration Cancellation Control System", Eric H. Anderson, Ph.D. Senior Engineer.

A Transportable High–Resolution Gamma–Ray Spectrometer and Analysis System Applicable to Mobile, Autonomous or Unattended Applications, Institute of Nuclear Materials Management Annual Meeting, Jul. 9–12, 1995, W.M. Buckley et al.

Interim Cryo–Cooler/Detector Report, Apr. 19, 1995, K.W. Neufeld et al.

*Primary Examiner*—Ronald Capossela
*Attorney, Agent, or Firm*—Lloyd E. Dakin, Jr.; John P. Wooldridge; Alan H. Thompson

[57] ABSTRACT

A system and method of active vibration control of an electro-mechanically cooled device is disclosed. A cryogenic cooling system is located within an environment. The cooling system is characterized by a vibration transfer function, which requires vibration transfer function coefficients. A vibration controller generates the vibration transfer function coefficients in response to various triggering events. The environments may differ by mounting apparatus, by proximity to vibration generating devices, or by temperature. The triggering event may be powering on the cooling system, reaching an operating temperature, or a reset action. A counterbalance responds to a drive signal generated by the vibration controller, based on the vibration signal and the vibration transfer function, which adjusts vibrations. The method first places a cryogenic cooling system within a first environment and then generates a first set of vibration transfer function coefficients, for a vibration transfer function of the cooling system. Next, the cryogenic cooling system is placed within a second environment and a second set of vibration transfer function coefficients are generated. Then, a counterbalance is driven, based on the vibration transfer function, to reduce vibrations received by a vibration sensitive element.

29 Claims, 6 Drawing Sheets

| HARMONIC (n) | DRIVE SIGNAL | | RESPONSE SIGNAL | |
|---|---|---|---|---|
| | AMPLITUDE | PHASE | AMPLITUDE | PHASE |
| n=0 | $A_{D0}$ | $P_{D0}$ | $A_{R0}$ | $P_{R0}$ |
| n=1 | $A_{D1}$ | $P_{D1}$ | $A_{R1}$ | $P_{R1}$ |
| n=2 | $A_{D2}$ | $P_{D2}$ | $A_{R2}$ | $P_{R2}$ |
| n=3 | $A_{D3}$ | $P_{D3}$ | $A_{R3}$ | $P_{R3}$ |
| n=4 | $A_{D4}$ | $P_{D4}$ | $A_{R4}$ | $P_{R4}$ |
| n=5 | $A_{D5}$ | $P_{D5}$ | $A_{R5}$ | $P_{R5}$ |
| n=6 | $A_{D6}$ | $P_{D6}$ | $A_{R6}$ | $P_{R6}$ |
| n=7 | $A_{D7}$ | $P_{D7}$ | $A_{R7}$ | $P_{R7}$ |
| n=8 | $A_{D8}$ | $P_{D8}$ | $A_{R8}$ | $P_{R8}$ |
| n=9 | $A_{D9}$ | $P_{D9}$ | $A_{R9}$ | $P_{R9}$ |

SYSTEM AND METHOD OF ACTIVE VIBRATION CONTROL FOR AN ELECTRO-MECHANICALLY COOLED DEVICE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to systems and methods for reducing vibration in electro-mechanically cooled devices, and more particularly of active vibration control for an electro-mechanically cooled device.

2. Discussion of Background Art

High-purity germanium (HPGe) radiation detectors are well known for their performance and reliability characteristics and have become a standard by which other radiation detectors are compared. HPGe detector systems have long been the standard for critical applications including uranium enrichment and plutonium isotopic analysis. Combining this high performance with the additional property of high efficiency, HPGe detectors provide very high resolution radio-nuclide spectra within a minimum acquisition time.

Though HPGe detector systems are recognized as a basic tool for isotopic analysis and have many field applications, since extensive support equipment is required for optimum operation, these systems have historically been used only in laboratories. HPGe detector systems typically require signal processing electronics for data acquisition (shaping amplifier, test pulser), a high voltage power supply for detector bias, a multi-channel analyzer (MCA), a computer including requisite software necessary for spectral analysis, and (most importantly) a continuous supply of Liquid Nitrogen (LN) to maintain the detector at its proper operating temperature. As a result, operating an HPGe detector in the field has been very difficult.

As the need for field deployable high energy resolution detectors has increased, many of the HPGe support systems have been reengineered for portable applications. Several integrated electronic systems are currently available that, when accompanied by a detector and portable computer, provide a portable data acquisition capability. Current systems on the market include the Mini MCA (GBS Elektronik), the $M^3CA$ (Los Alamos National Laboratory [LANL]), the Inspector (Canberra), and the Dart, MicroNOMAD, and NOMAD (EG&G ORTEC).

In addition to the reduced size, weight, and power requirements of detector systems, several manufacturers have developed small LN dewars that can provide temporary portable operation. These portable dewars typically hold enough LN to allow portable operation from 12 to over 36 hours. LN consumption is approximately 0.5 liters/day/watt with the typical HPGe detector heat load being approximately 2–3 watts once cooled to an operating temperature of about 77 Kelvin.

While these developments have provided significant improvements allowing for limited portable HPGe detector operation, many applications require longer acquisition periods, unattended operation, and/or operate in an elevated temperature environment that would rapidly deplete a typical LN supply. For these more demanding applications, either a larger LN dewars or an Electro-Mechanical Cooling (EMC) system is required.

Development of EMC systems was initially driven by infrared imaging technology for space-based applications. The imaging arrays were typically small volume devices and the space environment provided a good vacuum and a cold environment, so only a minimal amount of cooling was necessary. Since vibration in these applications would be detrimental to image quality, cooling the infrared imaging detector with an absolute minimum of vibration was critical. These cooling systems were often turned off for short periods during image acquisition to further reduce vibration. Several organizations (including TRW, Hughes, and Lockheed) developed methodologies for providing the required cooling, however, for various reasons these space-based solutions have not found widespread use in terrestrial-based instrumentation. For instance, a relatively higher heat load experienced by ground-based detection devices limits the time an EMC cooling system could be de-energized.

Most ground-based EMC-HPGe detectors incorporate continuously operating cooling systems into their design. These mechanical cooling systems inherently generate vibrations. These vibrations degrade the spectral resolution of HPGe detectors. This type of degradation, referred to as "microphonic noise," is defined as electronic noise which results from vibration. For instance, pre-amplifier circuits within HPGe detectors typically consist of a junction field effect transistor (JFET) whose base is connected to a germanium detector crystal by a flexible wire. Vibration from the EMC apparatus cause the wire to vibrate with respect to surrounding electrical components. Since the wire forms a parasitic capacitor with the surrounding components, this vibration induces a voltage on the wire which adds noise to a signal transmitted from the detector. This noise component reduces a signal to noise ratio of the pre-amplifier and degrades overall sensitivity of the EMC-HPGe detection system.

In response, EMC manufacturers have developed vibration control mechanisms that attempt to cancel out mechanical vibration. Some designs are "passive" and merely employ damping mechanisms. Other designs are "active" and use a dynamically adjustable counterbalance.

An active vibration control system typically operates by first characterizing the EMC-HPGe detection system based on well known vibration modeling equations and then using feedback to cancel any system vibrations using the adjustable counterbalance. These active vibration control systems however are "static" in design in that they only characterize the EMC-HPGe detection system once at the factory before shipping them out to the field. Kenneth W. Neufeld, Wayne D. Ruhter, and Eric H. Anderson describe such a statically-characterized active vibration control system in their paper entitled, *Interim Cryo-Cooler/Detector Report*, dated Apr. 19, 1995.

If the EMC was never moved from its position at the factory where the static characterization occurred, the static characterization method would be acceptable. However, field deployable EMC-HPGe detection systems are by their nature, often moved and placed on a variety of different surfaces and in a variety of different environments. These varying surfaces and environments change the vibration characteristics of the EMC-HPGe detection system from what it was at the factory. Thus, the static characterization which was good at the factory may no longer be acceptable in the field.

In response to the concerns discussed above, what is needed is an system and method of active vibration control for an electro-mechanically cooled device that overcomes the problems of the prior art.

SUMMARY OF THE INVENTION

The present invention is a system of active vibration control for an electro-mechanically cooled device. Within the system of the present invention, a cryogenic cooling system is located within a first environment. The cooling system is characterized by a vibration transfer function, which requires vibration transfer function coefficients. A vibration controller generates a first set of the vibration transfer function coefficients in response to a first triggering event. When the cryogenic cooling system is placed within a second environment, the vibration controller generates a second set of the vibration transfer function coefficients within the second environment in response to a second triggering event. The environments may differ by mounting apparatus, by proximity to vibration generating devices, or by temperature. The triggering event may be powering on the cooling system, reaching an operating temperature, or any reset action. Reset actions can include button presses, computer signals or other signals.

A vibration sensor positioned proximate to a vibration sensitive element generates a vibration signal. A counterbalance responds to a drive signal generated by the vibration controller. The vibration controller uses the vibration signal and the vibration transfer function to generate the drive signal for adjusting vibrations received by the vibration sensitive element.

Within the method of the present invention, a cryogenic cooling system is placed within a first environment and a first set of vibration transfer function coefficients are generated in response to a first triggering event. Next, when the cryogenic cooling system is placed within a second environment, a second set of vibration transfer function coefficients are generated in response to a second triggering event. The vibration transfer function coefficients are then added to a vibration transfer function of the cooling system. A counterbalance is driven, based on the vibration transfer function, to reduce vibrations received by a vibration sensitive element.

The vibration transfer function coefficients are generated by first, driving the counterbalance with a drive signal of known frequency, amplitude and phase. Next, a frequency, amplitude and phase of a response signal obtained from a vibration sensor positioned proximate to an area of the cooling system where vibration is of interest is recorded. This process is repeated for all frequencies at which vibration is to be actively damped. The vibration transfer function coefficients are then generated based on a comparison between the drive signal and the response signal.

These and other aspects of the invention will be recognized by those skilled in the art upon review of the detailed description, drawings, and claims set forth below.

BRIEF DESCRIPTION OF THE DRAWINGS

FIG. 4 is a table showing self-characterization data for the system of active vibration control;

DETAILED DESCRIPTION OF THE PREFERRED EMBODIMENT

Figure 1:
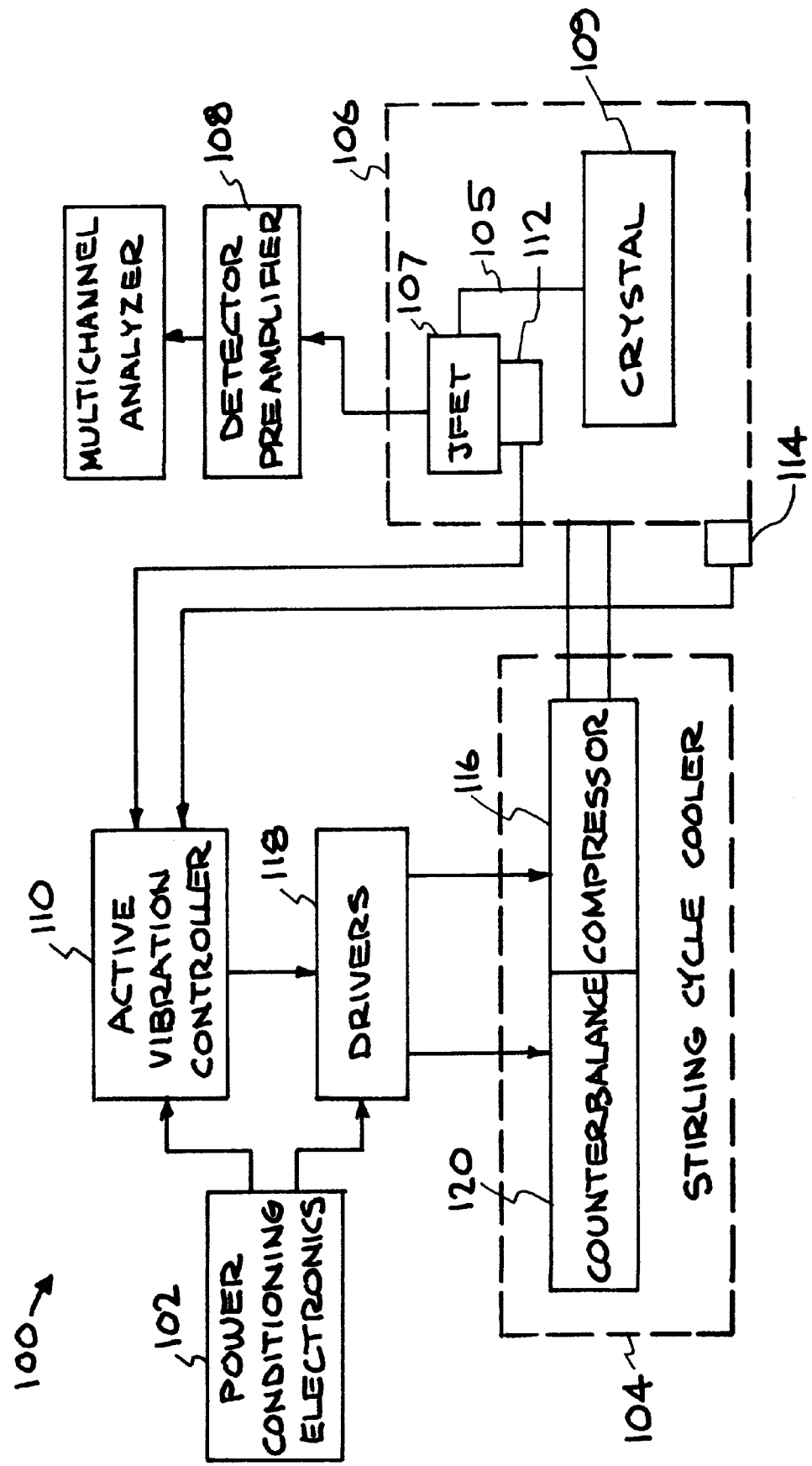
FIG. 1 is a block diagram of a system of active vibration control for an electro-mechanically cooled device.

FIG. 1 is a block diagram of a system 100 of active vibration control for an electro-mechanically cooled device. The system 100 includes power conditioning electronics 102, a Stirling cycle cooler 104, a detector 106, a preamplifier 108, an active vibration controller 110, a vibration sensor 114, and drivers 118. The system 100 is preferably designed as one package of similar size, weight, and operation as currently available portable liquid nitrogen systems.

The power conditioning electronics 102 are a complex system of DC-to-DC converters designed and configured to allow the system 100 to operate from a single +12 $V_{DC}$ input such as an automobile cigarette lighter. The ability to operate from a single +12 Volt power supply allows operation in any scenario that includes a vehicle (automobile, boat, and airplane), or a stand-alone battery. The system 100 requires about 100 watts during cool-down and 60 watts during steady state operation.

The Stirling cycle cryogenic cooler 104 is an Electro-Mechanical Cooler (EMC) available from Sunpower Corporation of Athens, Ohio and used to provide cooling/refrigeration to the detector 106. The cooler 104 includes a compressor 116 which effects cooling, and a counterbalance 120 for reducing vibrations caused by the compressor 116. The cooler 104 has a projected lifetime in excess of 50,000 hours (~6 years). The drivers 118 contain electronic controls for driving the compressor 116 and the counterbalance 120.

The detector 106 includes a High Purity Germanium (HPGe) crystal 109 a wire 105, a Junction Field Effect Transistor (JFET) 107, and a temperature sensor 112. The detector 106 enables high resolution radio-nuclide spectra data to be collected for further analysis by a multi-channel analyzer (not shown). The wire 105 connects the detector 106 to the JFET 107. The JFET 107 is in turn connected to the preamplifier 108.

The preamplifier 108 contains amplification and filtering circuitry which processes signals from the JFET 107. Typically the detector 106, JFET 107 and preamplifier 108 are part of an assembly available from one of several manufacturers, including EG&G ORTEC, Princeton Gamma Tech, Oxford, and Canberra. The size of the Ge crystal 109 in the detector 106 is independent of the system design. Signals output from the preamplifier 108 to the multi-channel analyzer may be interpreted by all standard isotopic analysis codes, such as GammaVision, Genie-PC, MGA, and MGA++, GAMANL, GRPANL and MGAU, which are well known in the art.

The active vibration controller 110 operates the cooler 104 in such a way as to minimize vibration while cooling the detector 106. To this end, the vibration controller 110 incorporates software that controls drive motors within the compressor 116 and the counterbalance 120. The compressor 116 is controlled based on a temperature of the JFET 107 measured by the temperature sensor 112 and recent drive cool-down history. The counterbalance 120 is controlled based on vibration, measured by the vibration sensor 114, and a vibration transfer function for modeling the vibration characteristics of the system 100. The vibration sensor 114 is preferably an accelerometer attached to the detector 106. The system response function (elaborated upon infra.) is automatically determined by the controller 110 in response to triggering events, such as when the system 100 is power-on and again when the detector 106 reaches an operating temperature.

The location of the sensors 112 and 114 is an important consideration in the design of the system 100 and is critical for optimizing performance. The vibration sensor 114 is preferably located as close as possible to any preselected vibration sensitive elements. In the current system 100, the vibration sensor 114 is preferably located as close as possible to the wire 105 connecting the JFET 107 to the detector 106. The wire 105 is typically very flexible and vibration from the cooler 104 causes the wire 105 to vibrate with respect to surrounding electrical components. Since the wire 105 forms a parasitic capacitor with these surrounding components, any vibration of the wire 105 induces a voltage on the wire 105, adding noise to signals transmitted to the JFET 107. Such noise reduces a signal to noise ratio of the pre-amplifier 108 and degrades overall sensitivity of the system 100. When the present invention is applied to different systems, those skilled in the art will know of other elements within these different systems where vibrations will have to be minimized in order for signal noise to be reduced to a minimum. Such other elements may include the Ge crystal 109 in the detector 106, with its piezoelectric properties, and compressor drive power fluctuations.

The temperature sensor 112 is preferably located as close as possible to a preselected temperature critical element. In the current system 100, preferably the temperature sensor 112 is co-located with the JFET 107. Thermic measurements of the system 100 have indicated that when the JFET 107 temperature is at 100 Kelvin, the detector 106 will be at 77 Kelvin, a typical detector operating temperature. Those skilled in the art will know that the present invention may be used in conjunction with sensors other than temperature and vibration sensors.

Figure 2:
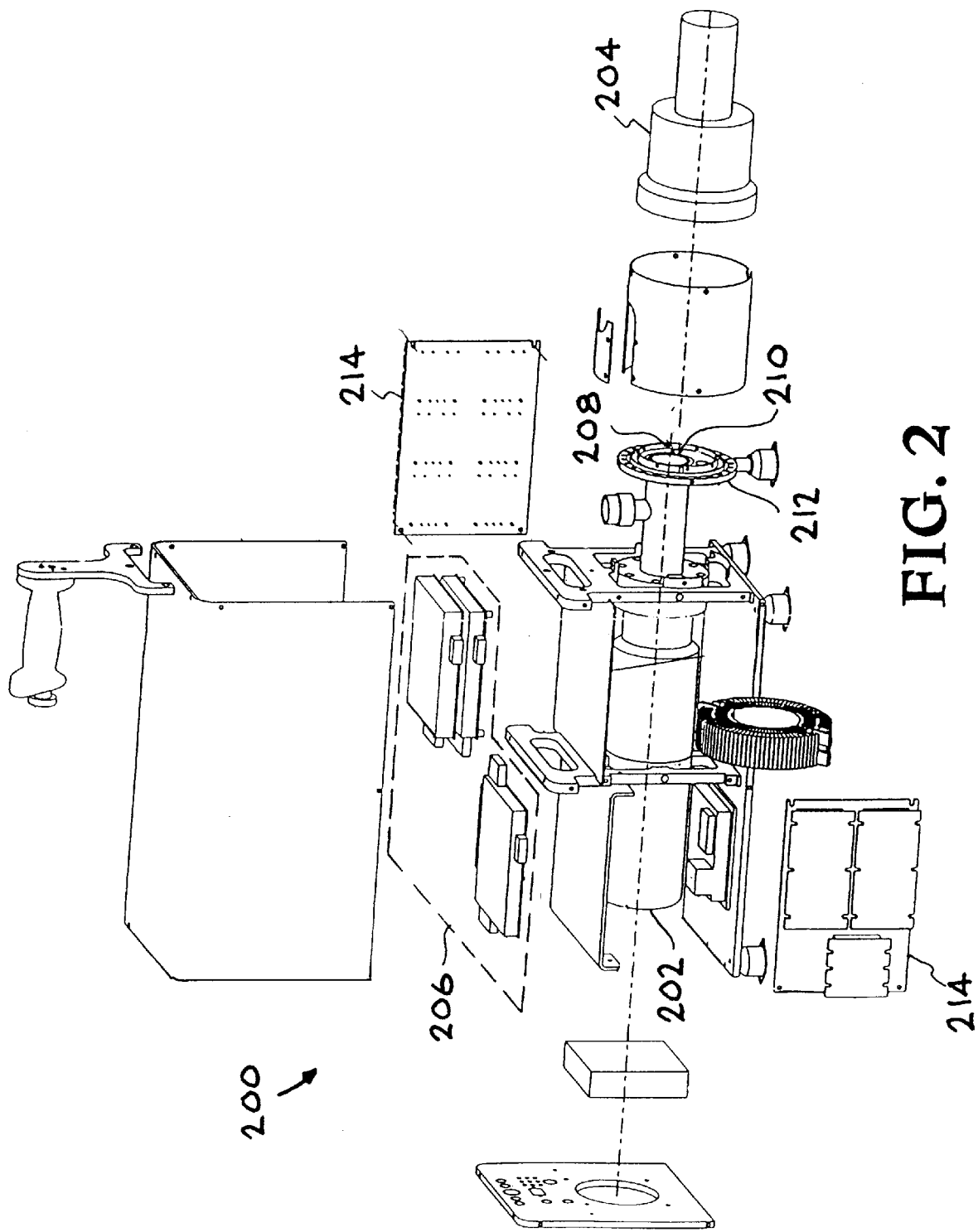
FIG. 2 is a pictorial diagram of one embodiment of the system of active vibration control, shown in FIG. 1.

FIG. 2 is a pictorial diagram of one embodiment 200 of the system 100 of active vibration control, shown in FIG. 1. The embodiment 200 shows an electromechanical cryo-cooler 202, a high-purity Ge detector 204, an active vibration controller 206, a JFET 208, a temperature sensor 210, a vibration sensor 212, and power conditioning electronics 214. Those skilled in the art will recognize that the system 100 may be embodied in a variety of packages other that the one shown in FIG. 2.

Figure 3:
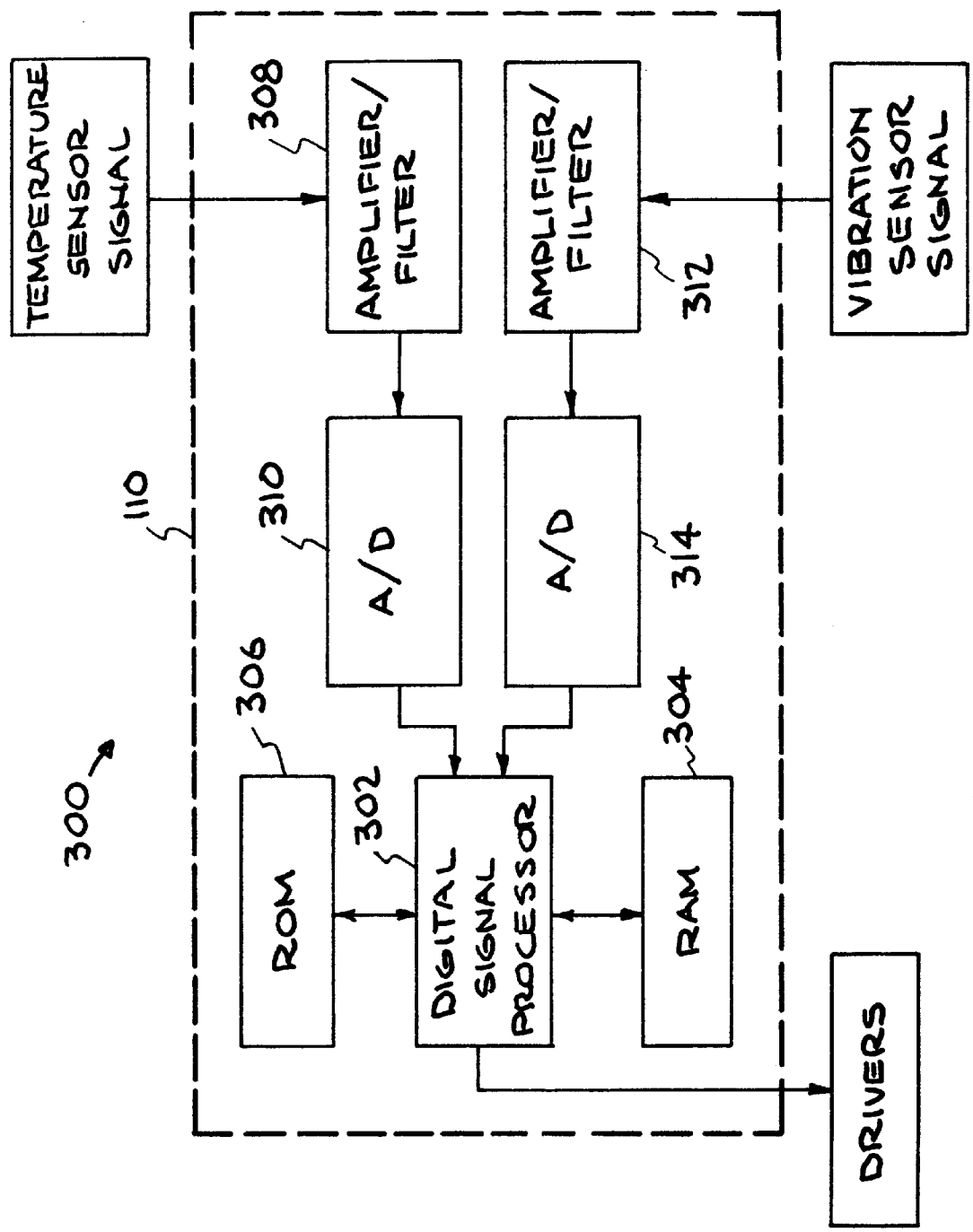
FIG. 3 is a block diagram of an active vibration controller in the system of active vibration control, shown in FIG. 1.

FIG. 3 is a block diagram of the active vibration controller 110 in the system 100 of active vibration control, shown in FIG. 1. The controller 110 includes a digital signal processor (DSP) 302 supported by random access memory (RAM) 304 and read-only memory (ROM) 306. The DSP 302 receives a first signal from the temperature sensor 112 through a first amp/filter 308 and a first analog to digital converter 310. The DSP 302 receives a second signal from the vibration sensor 114 through a second amp/filter 308 and a second analog to digital converter 310. The filters 308 are preferably low-pass filters of about 1 Hz bandwidth. Software stored in ROM 306 and loaded into RAM 304 is executed by the DSP 302 to control the drivers 118 in response to temperature and vibration signals. The temperature signals are used to control the compressor 116 and the vibration signals are used to control the counterbalance 120.

The ROM 306 and RAM 304 store computer program instructions for controlling how the DSP 302 accesses, transforms and outputs data. Those skilled in the art will recognize that the ROM 306 and RAM 304 could be supplemented with other computer usable storage media, including a compact disk, a magnetic drive or a dynamic random access memory.

The software program executed by the DSP 302 is independent of the detector 106 and the cooler 104, eliminating the necessity of tailoring the system 100 configuration to a particular application or set of equipment. The software maintains the detector 106 at a predetermined temperature and minimizes vibration of sensitive elements. To minimize vibration, the system 100 must be characterized.

System 100 characterization consists of generating a set of coefficients for the vibration transfer function. The vibration transfer function is one member of a general class of physical transfer functions. Transfer functions mathematically model systems and are well known in the art. A preselected vibration transfer function, which best applies to the system 100, is stored in the ROM 306.

Coefficients for the transfer function are empirically obtained by driving the counterbalance 120 to stimulate the system 100 with drive signals of known frequency, amplitude and phase, monitoring the vibration sensor 114 for corresponding response signals, and then using well known mathematical principles to generate the coefficients.

The system 100 is stimulated at a fundamental frequency and a first nine harmonics of the compressor 116. Those skilled in the art however, will recognize that the system 100 can be stimulated at any number of preselected frequencies which may or may not be harmonics of the fundamental frequency. Such additional stimulation may be desired when the system 100 is placed in the presence of other equipment which generates vibrations at other frequencies that would tend to corrupt detector 106 measurements.

The fundamental frequency of the Sunpower cryo-cooler is about 58.65 Hz. A table, shown in FIG. 4, stores self-characterization data from which the coefficients for the vibration transfer function are generated. The DSP 302 deactivates the compressor 116 during characterization.

System 100 characterization is first performed when power is first applied to the system 100. Even though at power-on the system 100 is not yet at an operating temperature such that reliable data can be obtained, by performing the first characterization, vibration of the system 100 can be minimized so that, for instance, if the system 100 is placed on a table, the system 100 would not tend to vibrate and fall off the table.

A second system 100 characterization is performed when the detector reaches the operating temperature. Data is typically taken at this temperature and thus parasitic signals induced by vibrations must be minimized. The second characterization is necessary since the coefficients of the vibration transfer function for the system 100 are a function of temperature and change as the system 100 cools. In addition, The system 100 characterizations may be performed at any time in response to the reset action.

Once the system 100 has been characterized, the software executing in the DSP 302 uses the sensor signals, vibration transfer function, and vibration transfer functions coefficients to maintain the system 100 at the operating temperature with minimal vibration.

FIG. 4 is a table 400 showing self-characterization data for the system 100 of active vibration control. For the fundamental frequency (n=0) and each of the nine harmonic (n) frequencies, in the table 400, a drive signal amplitude ($A_D$) and phase ($P_D$) is generated. A corresponding response signal amplitude ($A_R$) and phase ($P_R$) is recorded. This software in the DSP 302 uses this characterization data to generate the coefficients for the vibration transfer function which models the system 100.

Figure 5:
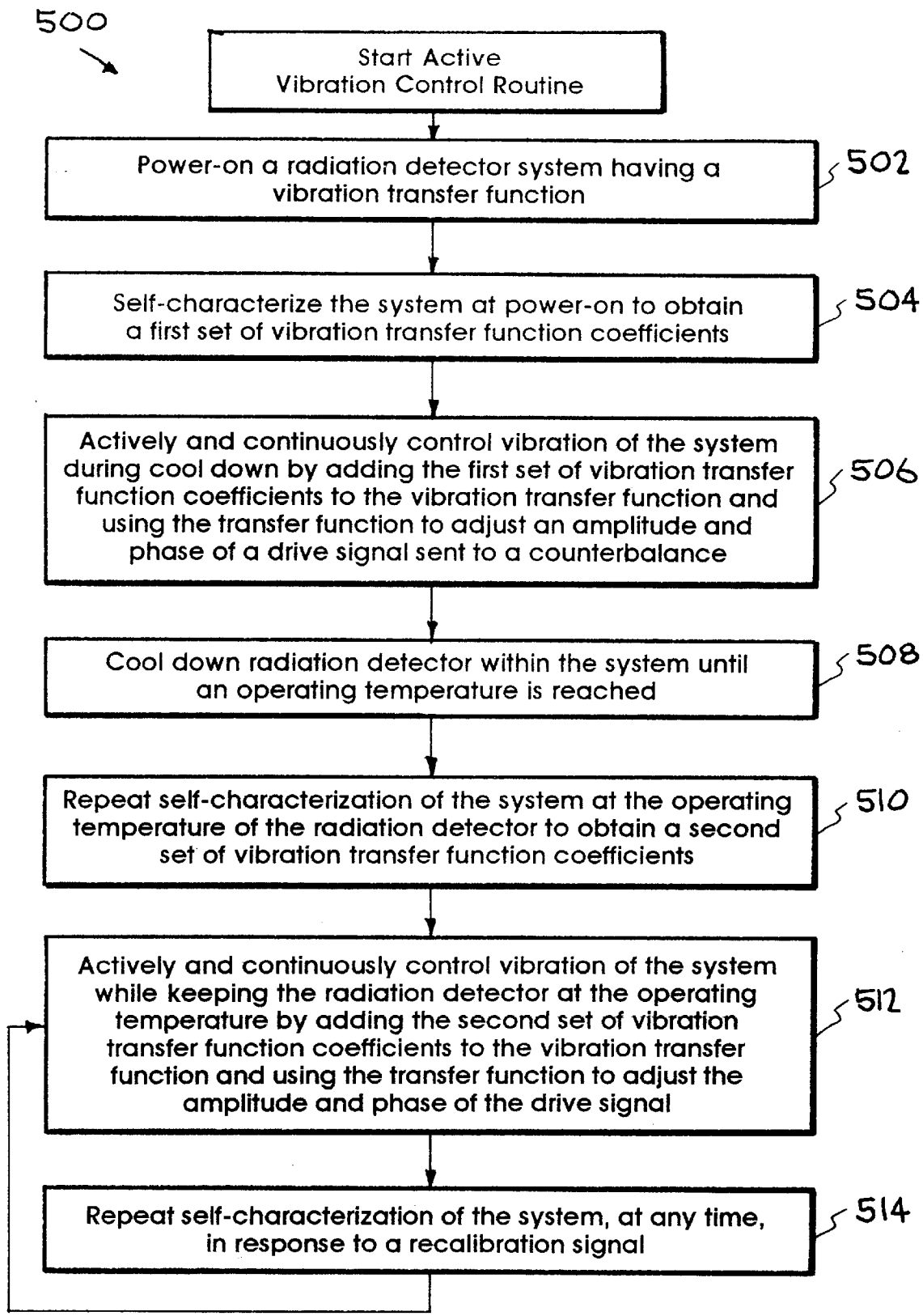
FIG. 5 is a flowchart of a method of active vibration control for an electro-mechanically cooled radiation detection system.

FIG. 5 is a flowchart 500 of a method of active vibration control for the electro-mechanically cooled radiation detection system 100. The method begins in step 502 where the system 100 having a vibration transfer function is powered on in response to a user input. Next, in step 504 the system 100 is self-characterized at power-on to obtain a first set of vibration transfer function coefficients. Step 504 is expanded upon in FIG. 6. In step 506, vibration of the system 100 is actively and continuously controlled during cool down by adding the first set of vibration transfer function coefficients to the vibration transfer function and using the transfer function to adjust the frequency, amplitude and phase of the drive signal sent to the counterbalance 120. The radiation detector 106 within the system 100 is cooled down by the cooler 104 until an operating temperature is reached, in step 508. When the operating temperature is reached, compressor 116 power is reduced by about 15%. Next, in step 510, self-characterization of the system is repeated at the operating temperature of the radiation detector 106 to obtain a second set of vibration transfer function coefficients. Step 510 is expanded upon in FIG. 6. In step 512, while the radiation detector 106 is kept at the operating temperature, vibration of the system 100 is actively and continuously controlled by replacing the first set of vibration transfer function coefficients with the second set of vibration transfer function coefficients and using the transfer function to adjust the frequency, amplitude and phase of the drive signal sent to the counterbalance 120. Next, in step 514, self-characterization of the system 100 is repeated, at any time, in response to a recalibration signal sent at predetermined times, or in response to a user input. The self-characterization incorporated into the present invention represents a significant departure from the current state of the art. Current prior art characterizations are only performed once, such as at a factory or when first installed within a single stable environment. As a result, vibration transfer function coefficients which were appropriate while the cooler was at the factory, or in one environment, are no longer appropriate once the cooler is taken to a new field location and placed within a different mounting apparatus or within a different environment. The self-characterization taught by the present invention, in contrast, generates an appropriate set of coefficients for each environment in which the system 100 is located each time the system 100 is powered on, reaches operating temperature, or in response to the reset action. After step 514, the process of active vibration control returns to step 512.

Figure 6:
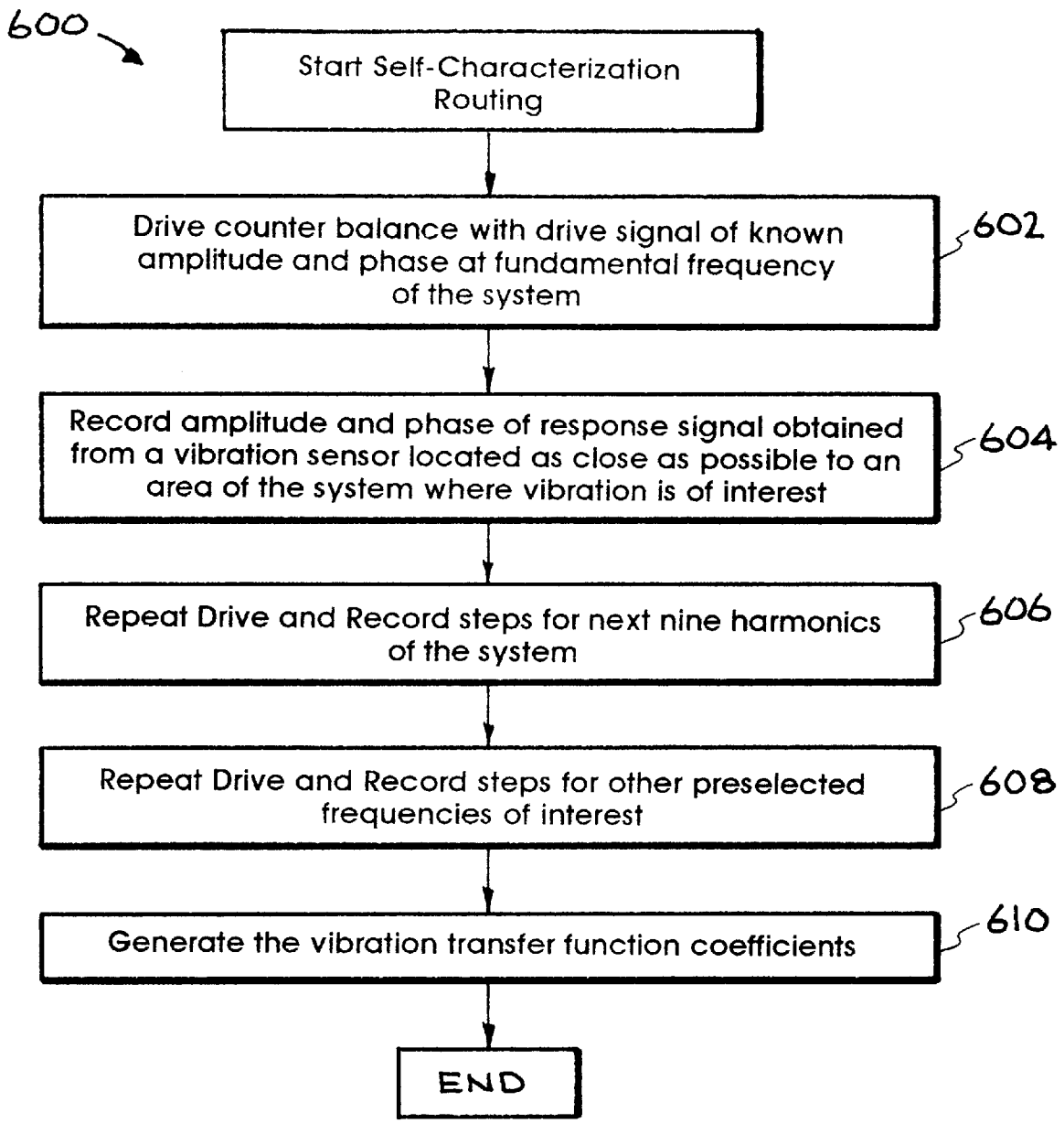
FIG. 6 is a flowchart of a method for self-characterization within the method of active vibration control of FIG. 5.

FIG. 6 is a flowchart of a method for self-characterization within the method of active vibration control of FIG. 5 (steps 504 and 510 of FIG. 5). The method begins in step 602 by driving the counter balance 120 with a drive signal of known frequency, amplitude and phase at the fundamental frequency of the system 100. Next, in step 604, a response signal from the vibration sensor 114 is recorded, from which the transfer function coefficients are determined. The vibration sensor 114 is located as close as possible to an area of the system 100 most sensitive to vibration. In the embodiment of the present invention shown in FIG. 1, the vibration sensor 114 is preferably located as close to the wire 105 connecting the JFET 107 to the detector 106. In step 606, the drive and record steps (i.e. steps 602 and 604) are repeated for the next nine harmonics of the system 100. Optionally, the drive and record steps are also repeated for other preselected frequencies of interest, in step 608. These other preselected frequencies are based on an environment in which the system 100 is placed. For instance, the system 100 may be placed near 60 Hz power generation equipment, or near other heavy machinery which generates vibrations at various other frequencies and could thus interfere with system 100 measurements. Next, in step 610, the vibration transfer function coefficients are generated using known mathematical principles. These coefficients are then inserted into the vibration transfer function equation upon which the vibration characteristics of the system 100 are modeled. After step 610, the process of self-characterization is complete.

While the present invention has been described with reference to a preferred embodiment, those skilled in the art will recognize that various modifications may be made. For instance, the detector 106 could alternatively be a radiation detector of any sort, such as an optical or infrared detector. Variations upon and modifications to the preferred embodiment are provided by the present invention, which is limited only by the following claims.

What is claimed is:

1. A system of active vibration control, comprising:

a cryogenic cooling system characterized by a vibration transfer function, which requires vibration transfer function coefficients; and a vibration controller coupled to the cooling system, comprising means for generating vibration transfer coefficients in response to a triggering event, wherein said means for generating vibration transfer coefficients automatically obtains a first set of vibration transfer coefficients when said cryogenic cooling system is turned on, wherein said means for generating vibration transfer coefficients automatically obtains a second set of vibration transfer coefficients when said cryogenic cooling system reaches its operating temperature and wherein said means for generating vibration transfer coefficients obtains at least one additional set of vibration transfer coefficients at any time in response to a recalibration signal.

2. The system of claim 1, further comprising:

a vibration sensitive element coupled to the cooling system; and a vibration sensor positioned proximate to the vibration sensitive element for generating a vibration signal;

wherein the vibration controller is coupled to the vibration sensor and, using the vibration signal, generates the vibration transfer function coefficients.

3. The system of claim 2, further comprising:

detector electronics coupled to the cooling system;

wherein the vibration sensitive element is the detector electronics.

4. The system of claim 2, further comprising:

a detector coupled to the cooling system;

an amplifier; and a wire coupling the detector to the amplifier;

wherein the vibration sensitive element is the wire.

5. The system of claim 4, wherein the detector is a Germanium radiation detector.

6. The system of claim 4, wherein the detector is a optical radiation detector.

7. The system of claim 4, wherein the detector is an infrared radiation detector.

8. The system of claim 4, wherein the amplifier is a JFET amplifier.

9. The system of claim 2, further comprising:

a detector coupled to the cooling system;

wherein the vibration sensitive element is the detector.

10. The system of claim 2, further comprising:

a counterbalance, coupled to the cooling system and the vibration controller, and responsive to a counterbalance drive signal;

wherein the vibration controller uses the vibration signal and the vibration transfer function to generate the counterbalance drive signal for adjusting vibrations received by the vibration sensitive element.

11. The system of claim 4, further comprising:

a temperature sensor coupled to the amplifier for generating a temperature signal;

wherein the vibration controller is coupled to receive the temperature signal and in response control the cooling system.

12. A method of active vibration control, comprising the steps of:

placing a cryogenic cooling system within a first environment;

generating a first set of vibration transfer function coefficients, for a vibration transfer function of the cooling system within the first environment, in response to a first triggering event, wherein said first triggering event comprises providing power to said cryogenic cooling system;

generating a second set of vibration transfer function coefficients, for a second vibration transfer function of the cooling system within the first environment, in response to a second triggering event, wherein said second triggering event comprises said cryogenic cooling system reaching its operating temperature;

placing the cryogenic cooling system within a second environment; and generating a third set of vibration transfer function coefficients, for the vibration transfer function of the cooling system within the second environment, in response to a third triggering event, wherein said third triggering event comprises a reset action.

13. The method of claim 12, wherein:

the first placing step includes the step of placing the cryogenic cooling system on a first mounting apparatus; and the second placing step includes the step of placing the cryogenic cooling system on a second mounting apparatus.

14. The method of claim 12, wherein:

the first placing step includes the step of placing the cryogenic cooling system a first distance from a vibration generating source; and the second placing step includes the step of placing the cryogenic cooling system a second distance from the vibration generating source.

15. The method of claim 12, wherein:

the first placing step includes the step of placing the cryogenic cooling system at a first temperature; and the second placing step includes the step of placing the cryogenic cooling system at a second temperature.

16. The method of claim 12, further comprising the steps of:

identifying a vibration sensitive element within the cooling system; and placing a vibration sensor, which generates a vibration signal, proximate to the vibration sensitive element;

wherein the generating step includes the step of generating the first set of vibration transfer function coefficients using the vibration signal.

17. The method of claim 16, further comprising the steps of:

generating a counterbalance drive signal based on the vibration transfer function; and driving a counterbalance with the counterbalance drive signal for adjusting vibrations received by the vibration sensitive element.

18. The method of claim 12 wherein the generating step includes the steps of:

driving a counterbalance with a drive signal of known frequency, amplitude and phase;

recording an amplitude and phase of a response signal obtained from a vibration sensor positioned proximate to an area of the cooling system where vibration is of interest; and generating the vibration transfer function coefficients based on a comparison between the drive signal and the response signal.

19. A computer-usable medium embodying computer program code for causing a computer to actively control vibration by performing the steps of:

placing a cryogenic cooling system within a first environment;

generating a first set of vibration transfer function coefficients, for a vibration transfer function of the cooling system within the first environment, in response to a first triggering event, wherein said first triggering event comprises providing power to said cryogenic cooling system;

generating a second set of vibration transfer function coefficients, for a second vibration transfer function of the cooling system within the first environment, in response to a second triggering event, wherein said second triggering event comprises said cryogenic cooling system reaching its operating temperature;

placing the cryogenic cooling system within a second environment; and generating a third set of vibration transfer function coefficients, for the vibration transfer function of the cooling system within the second environment, in response to a third triggering event, wherein said third triggering event comprises a reset action.

20. The computer-usable medium of claim 19, wherein:

the first placing step includes the step of placing the cryogenic cooling system on a first mounting apparatus; and the second placing step includes the step of placing the cryogenic cooling system on a second mounting apparatus.

21. The computer-usable medium of claim 19, wherein:

the first placing step includes the step of placing the cryogenic cooling system a first distance from a vibration generating source; and the second placing step includes the step of placing the cryogenic cooling system a second distance from the vibration generating source.

22. The computer-usable medium of claim 19, wherein:

the first placing step includes the step of placing the cryogenic cooling system at a first temperature; and the second placing step includes the step of placing the cryogenic cooling system at a second temperature.

23. The computer-usable medium of claim 19, further performing the steps of:

identifying a vibration sensitive element within the cooling system; and placing a vibration sensor, which generates a vibration signal, proximate to the vibration sensitive element;

wherein the generating step includes the step of generating the first set of vibration transfer function coefficients using the vibration signal.

24. The computer-usable medium of claim 23, further performing the steps of:
   generating a counterbalance drive signal based on the vibration transfer function; and
   driving a counterbalance with the counterbalance drive signal for adjusting vibrations received by the vibration sensitive element.

25. The computer-usable medium of claim 19 wherein the generating step includes the steps of:
   driving a counterbalance with a drive signal of known frequency, amplitude and phase;
   recording an amplitude and phase of a response signal obtained from a vibration sensor positioned proximate to an area of the cooling system where vibration is of interest; and
   generating the vibration transfer function coefficients based on a comparison between the drive signal and the response signal.

26. An apparatus for active vibration control of an electro-mechanically cooled device, comprising:
   a Stirling cryocooler compressor for operative connection to cool an electromechanically cooled device;
   a counterbalance operatively connected to said compressor to provide a mechanical means of reducing vibrations in said electromechanically cooled device;
   a pulsewidth modulator motor drive connected to said compressor and counterbalance to provide electrical signals to operate said compressor and counterbalance;
   an accelerometer sensor for operative mounting in proximity to said electro-mechanically cooled device to sense motion;
   a temperature sensor for connection to said electro-mechanically cooled device to monitor device temperature;
   a digital signal processor based single board computer operatively connected to said pulsewidth modulator, wherein said computer comprises means for active vibration control of said electro-mechanically cooled device, wherein said computer further comprises means for vibration self-characterization; and
   an analog signal and conditioning interface board connected to said digital signal processor based single board computer to provide signals from said accelerometer sensor and said temperature sensor to said computer.

27. The apparatus of claim 26, wherein said means for active vibration control of said electro-mechanically cooled device comprise:
   means for characterizing the vibrations of said electro-mechanically cooled device to obtain a first set of vibration transfer function coefficients;
   means for actively and continuously controlling the vibrations of said electro-mechanically cooled device during cool down by adding said first set of vibration transfer function coefficients to a vibration transfer function and using said vibration transfer function to adjust an amplitude and phase of a drive signal sent to said counterbalance;
   means for recharacterizing the vibrations of said electro-mechanically cooled device at the operating temperature to obtain a second set of vibration transfer function coefficients;
   means for actively and continuously controlling the vibrations of said electro-mechanically cooled device at said operating temperature by adding said second set of vibration transfer function coefficients to said vibration transfer function and using said vibration transfer function to adjust said amplitude and phase of said drive signal sent to said counterbalance.

28. The apparatus of claim 27, further comprising means for actively and continuously controlling the vibrations of said electro-mechanically cooled device at any time, in response to a recalibration signal.

29. The apparatus of claim 26, wherein said means for vibration self-characterization comprises:
   means for driving said counterbalance with a drive signal of a known amplitude and phase at a fundamental frequency and the next nine harmonic frequencies of the vibrations of said electro-mechanically cooled device;
   means for recording the amplitude and phase of a response signal produced by said frequencies as obtained from said accelerometer sensor; and
   means for generating vibration transfer function coefficients.

* * * * *